(12) United States Patent
Grosjean et al.

(10) Patent No.: US 9,335,561 B2
(45) Date of Patent: May 10, 2016

(54) TELESCOPICALLY ADJUSTABLE PAIR OF SPECTACLES

(75) Inventors: Nathalie Grosjean, Seltz (FR); Arcangelo Costantin, Forno Di Zoldo (IT)

(73) Assignee: Louis Vuitton Malletier, Paris (FR)

( * ) Notice: Subject to any disclaimer, the term of this patent is extended or adjusted under 35 U.S.C. 154(b) by 556 days.

(21) Appl. No.: 13/812,454

(22) PCT Filed: Jul. 27, 2011

(86) PCT No.: PCT/FR2011/051804
§ 371 (c)(1),
(2), (4) Date: Jan. 25, 2013

(87) PCT Pub. No.: WO2012/013898
PCT Pub. Date: Feb. 2, 2012

(65) Prior Publication Data
US 2013/0128219 A1    May 23, 2013

(30) Foreign Application Priority Data
Jul. 29, 2010 (FR) ..................................... 10 56292

(51) Int. Cl.
*G02C 5/20* (2006.01)
*G02C 5/10* (2006.01)
*G02C 5/22* (2006.01)

(52) U.S. Cl.
CPC .. *G02C 5/20* (2013.01); *G02C 5/10* (2013.01); *G02C 5/2263* (2013.01); *G02C 2200/18* (2013.01)

(58) Field of Classification Search
CPC .......... G02C 5/14; G02C 5/143; G02C 5/146; G02C 5/16; G02C 5/18; G02C 5/20
USPC ......................... 351/111, 113, 115, 117–119
See application file for complete search history.

(56) References Cited

U.S. PATENT DOCUMENTS 4,787,728 A    11/1988   Anger
4,848,892 A *   7/1989   Sonthonnax .................. 351/118
(Continued)

FOREIGN PATENT DOCUMENTS

DE        9301535        3/1993
EP        0878728        11/1998
(Continued)

OTHER PUBLICATIONS

International Search Report for PCT/FR2011/051804 dated Oct. 21, 2011, 3 pages.
(Continued)

*Primary Examiner* — David N Spector
*Assistant Examiner* — Robert E Tallman
(74) *Attorney, Agent, or Firm* — Reising Ethington P.C.

(57) ABSTRACT

The invention relates to a pair of spectacles, comprising a viewing portion and two side arms that are each connected to the viewing portion, each side arm including a first portion and a second portion sliding relative to one another in a sliding direction between a retracted position and an extended position, said pair of spectacles being characterized in that: the first portion includes a first pair of legs extending in the sliding direction; the second portion includes a second pair of legs extending in the sliding direction; and the first pair of legs and the second pair of legs are mutually engaged.

12 Claims, 4 Drawing Sheets

(56) References Cited

U.S. PATENT DOCUMENTS

| | | |
|---|---|---|
| 5,652,635 A | 7/1997 | Kirschner |
| 5,812,234 A | 9/1998 | Carswell |
| 5,890,235 A | 4/1999 | Wiedner et al. |
| 7,300,150 B1 | 11/2007 | Chen |
| 2004/0141149 A1 | 7/2004 | Blanchette et al. |
| 2004/0145699 A1 | 7/2004 | Wu |
| 2009/0015784 A1* | 1/2009 | Van Atta et al. ............ 351/116 |

FOREIGN PATENT DOCUMENTS

| | | |
|---|---|---|
| EP | 2096486 | 9/2009 |
| JP | 04066914 | 3/1992 |
| WO | WO2004/046790 | 6/2004 |

OTHER PUBLICATIONS

FR Search Report and Opinion for FR 10 56292 dated Jan. 11, 2011, 9 pages (non-translated).

\* cited by examiner

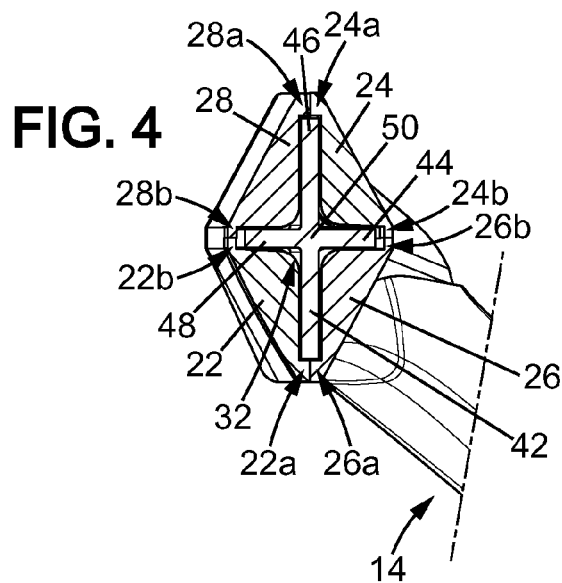

TELESCOPICALLY ADJUSTABLE PAIR OF SPECTACLES

OBJECT OF THE INVENTION

The invention relates to a pair of spectacles comprising a viewing portion and two side arms that are each connected to the viewing portion in a manner that offers telescoping adjustment.

BACKGROUND OF THE INVENTION

In a well known manner, such an adjustment is intended to vary the length of the side arms in order to adjust to the physiological differences between the people who wear these spectacles. Such an adjustment can also serve to increase the retention of the spectacles on the face of a specific person during certain activities in order to prevent the spectacles from shifting their position on the face or falling off in extreme cases. The invention also relates to this particularly desirable alternative when wanting to participate in athletic activities, for example.

There is a known conventional pair of spectacles of this type in which each side arm comprises a first portion and a second portion that slide relative to one another in a sliding direction, between a retracted position and an extended position.

SUMMARY OF THE INVENTION

The invention aims to propose a simple, robust, and aesthetically pleasing solution.

To achieve this, the pair of spectacles according to the invention additionally comprises the following features:
- the first portion of the side arms comprises a first pair of legs extending in the sliding direction,
- the second portion of the side arms comprises a second pair of legs extending in the sliding direction,
- the first pair of legs and the second pair of legs are mutually engaged.

Thus the legs in the first pair and the legs in the second pair guide each other in their sliding motion while preventing any relative rotational movement.

In another preferable feature of the invention, each side arm additionally comprises a core comprising four wings extending between the pairs of legs and connected to each other at a join line extending along the sliding direction.

Thus the legs can be shortened while improving the precision of the guidance between the first portion and the second portion.

In another feature of the invention, the core preferably extends along the sliding direction and has a cross-section perpendicular to the sliding direction that is in the form of a cross with orthogonal arms.

The guidance between the first portion and the second portion is thus further improved and the risk of jamming and interference with the sliding is reduced.

In another feature of the invention, the core is preferably attached to the first portion.

The simplicity of the implementation is thus increased and adjustment is facilitated.

In a complementary feature of the invention, the second portion is preferably retained in a releasable manner on the core, in the extended position of the side arm.

The use of the pair of spectacles is thus more pleasant and ergonomic.

In another complementary feature, the second portion is preferably retained in a releasable manner on the core when the side arm is in the retracted position.

The use of the pair of spectacles is thus even more pleasant and ergonomic.

In yet another complementary feature of the invention, the core preferably comprises at least one hook suitable for catching on a pin attached to the second portion.

This solution is simple, effective, and robust.

In another feature of the invention, the first portion and second portion are preferably of plastic, and the core is of metal.

This improves the robustness and ease of implementation.

In yet another feature of the invention, the core is preferably concealed between the first portion and the second portion when the side arm is in the retracted position.

This increases the aesthetics.

In another feature of the invention, the first portion and second portion preferably each present an outer surface that is flush with the outer surface of the other when the side arm is in the retracted position.

This further increases the aesthetics.

In another feature of the invention, the retracted position and the extended position preferably constitute two extreme sliding positions along the sliding direction, between which any relative rotational motion between the first portion and the second portion of each side arm is prevented.

Thus the use of the pair of spectacles is simplified and enhances its usability.

In another feature of the invention, the retracted position and the extended position preferably constitute two stable positions, advantageously extreme positions in the sliding direction, where the side arm is able to remain without external action.

In this manner the pair of spectacles offers enhanced usability for multiple users.

BRIEF DESCRIPTION OF THE FIGURES

Other features and advantages of the invention will be apparent from the following detailed description, referring to the attached drawings in which:

FIG. 4 is a cross-sectional view along the line referenced IV-IV in FIG. 2, at an enlarged scale, FIG. 5 is a cross-sectional view along the line referenced V-V in FIG. 1, with the side arms in a middle pantoscopic adjustment position, FIG. 6 illustrates the pair of spectacles of FIG. 5, with the side arms in a first extreme position of pantoscopic adjustment, FIG. 7 illustrates the pair of spectacles of FIG. 5, with the side arms in a second extreme position of pantoscopic adjustment.

DETAILED DESCRIPTION

Figure 1:
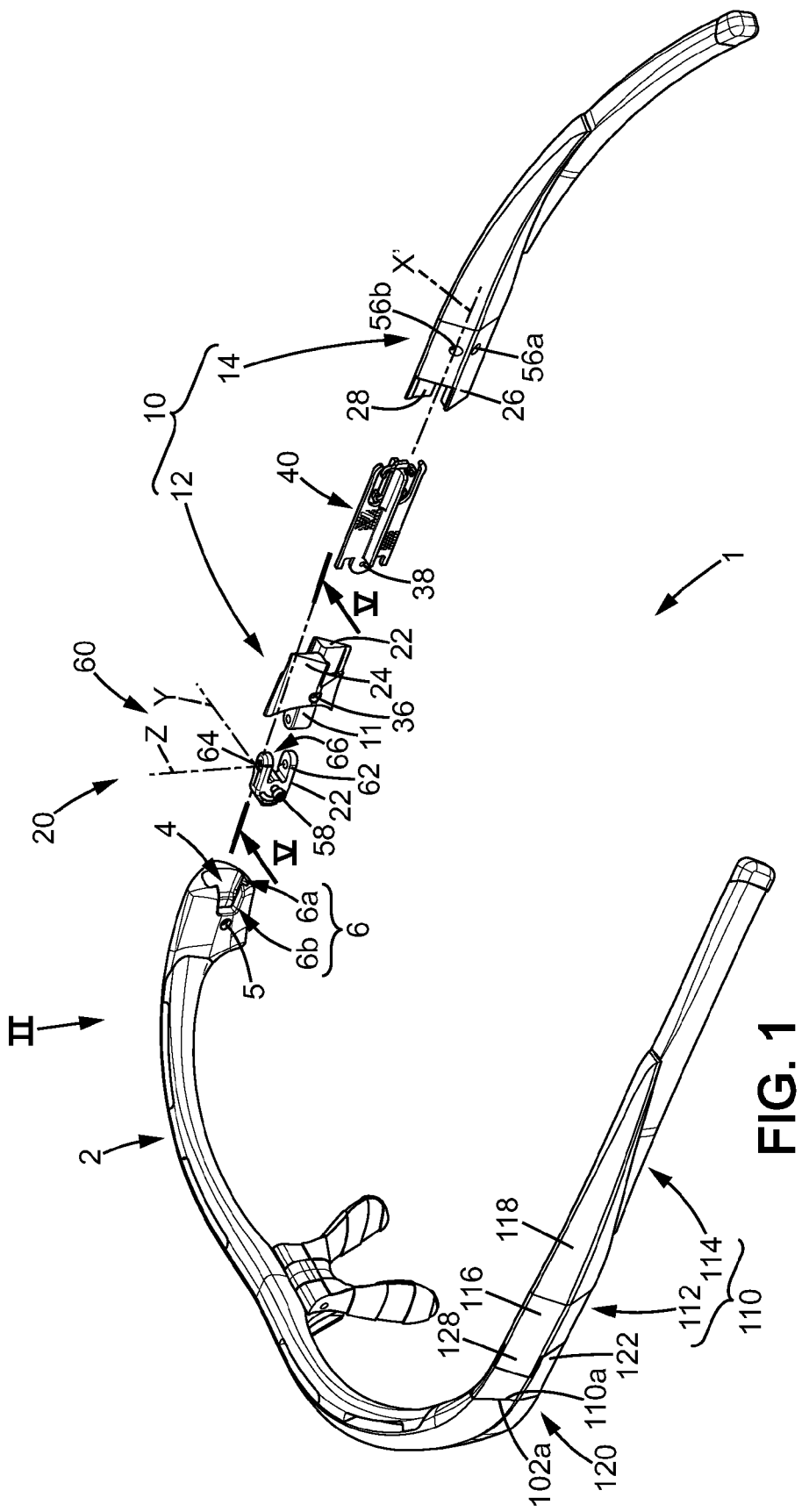
FIG. 1 illustrates a partially exploded perspective view of a pair of spectacles of the invention, comprising two side arms.

The various figures illustrate a pair of spectacles 1 essentially comprising a viewing portion 2, a right side arm 10, and a left side arm 110, each arm connected to the viewing portion 2 by a hinge 20, 120 comprising an intermediate element 60.

The viewing portion 2 extends along the front and supports the lenses (not represented).

The pair of spectacles 1 is symmetrical relative to a midplane, with the two side arms 10, 110 and the two hinges 20, 120 extending to each side of it. Therefore, unless otherwise stated, in the rest of the description the two side arms 10, 110 and the two hinges 20, 120 will be described simultaneously. Elements symmetrical to one another are labeled with numbers differing by 100.

Figure 2:
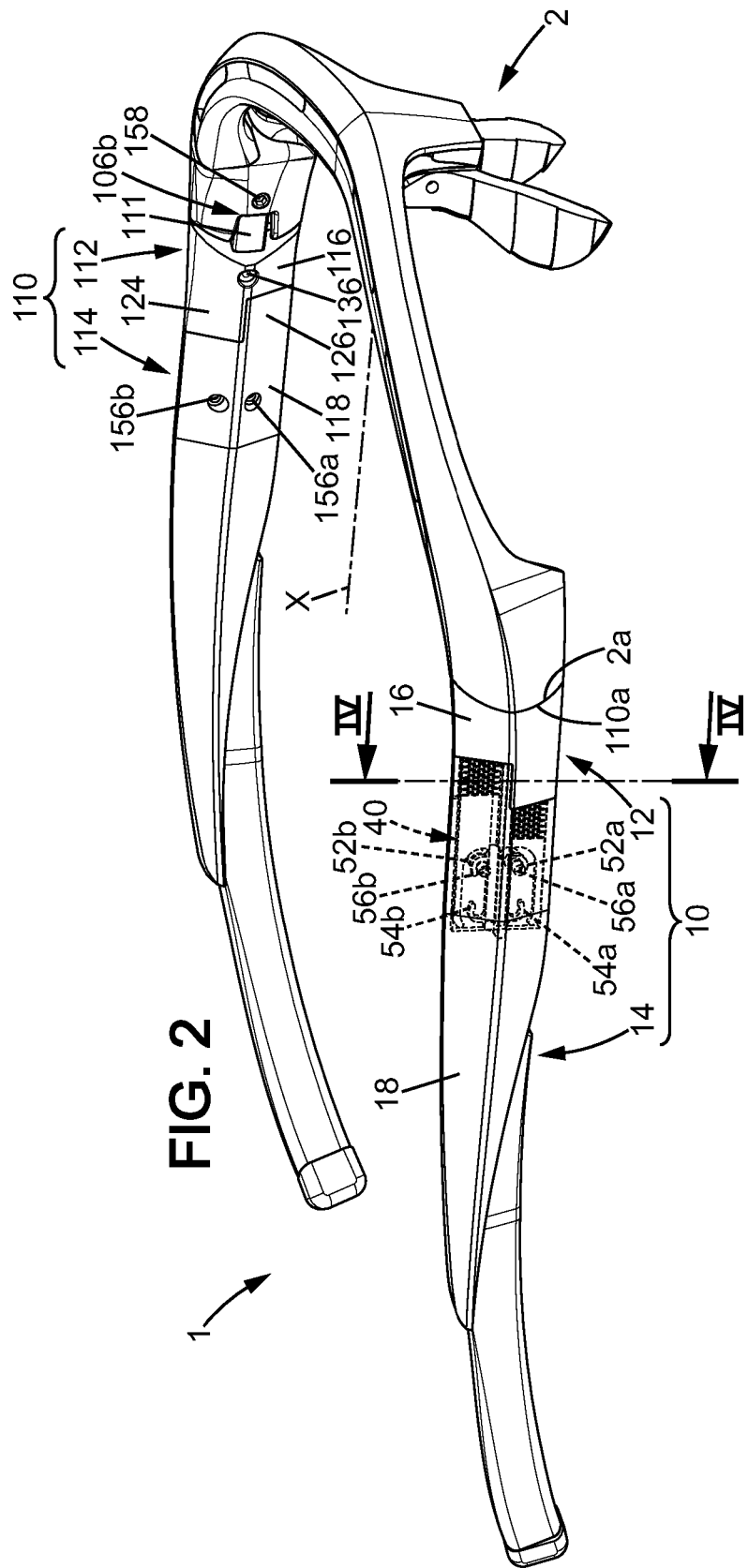
FIG. 2 is a perspective view of the pair of spectacles from the arrow labeled II in FIG. 1, with the side arms in the retracted position.
Figure 3:
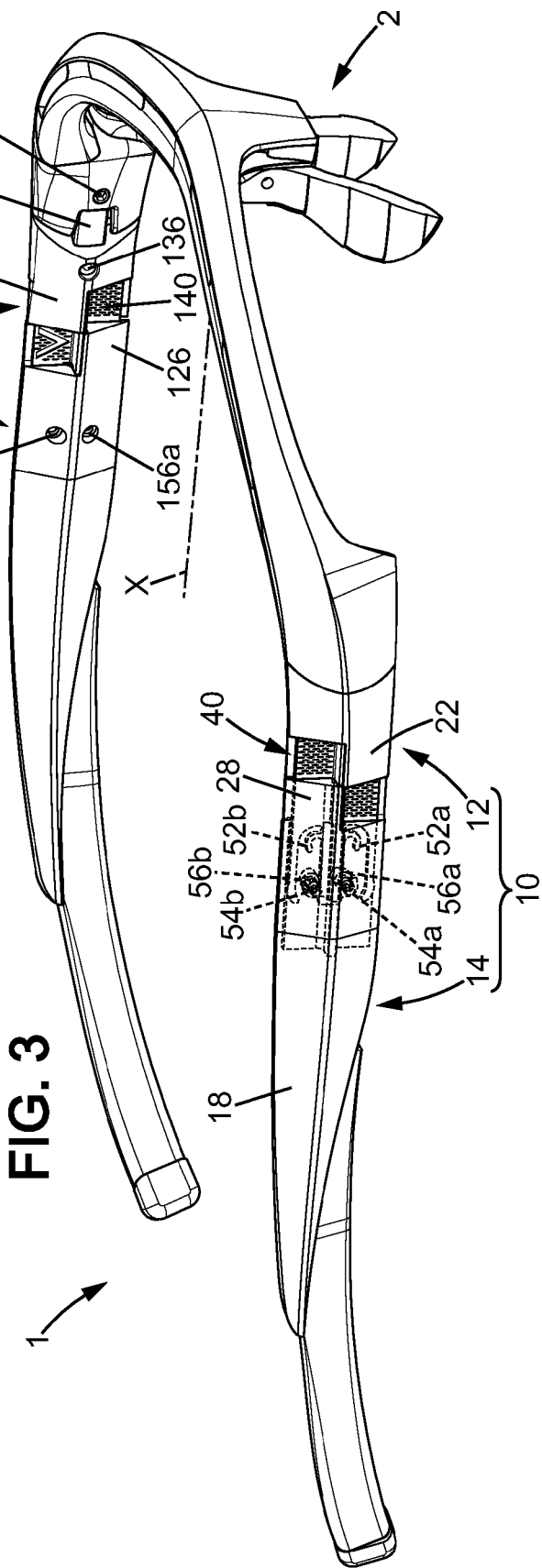
FIG. 3 illustrates the pair of spectacles of FIG. 2 with the side arms in the extended position.

The side arms 10, 110 each comprise a front portion 12 and a rear portion 14 each arranged as the extension of the other in a sliding direction X' and able to slide relative to each other, preferably without rotation, in the sliding direction X' between a retracted position illustrated in particular in FIG. 2 and an extended position illustrated in FIG. 3.

The rear portion 14, 114 extends in the sliding direction X' between a free back end, intended for placement on the ears of a user, and a front end on which is arranged a pair of rear legs 26, 28; 126, 128 extending in the sliding direction X'.

The front portion 12, 112 extends in the sliding direction X' between a back end, on which is arranged a pair of front legs 22, 24; 122, 124, and a front end on which is arranged a tongue 11, 111.

The side arms 10, 110 additionally comprise a core 40, 140 extending in the sliding direction X'. As illustrated in particular in FIG. 4, the core 40, 140 has a cross-section in the form of a cross comprising four orthogonal wings 42, 44, 46, 48, connected to each other at a join line 50. Each leg 22, 24, 26, 28 is in close contact with two adjacent wings. There is a recess 22a, 22b; 24a, 24b; 26a, 26b; 28a, 28b in each of the legs 22, 24, 26, 28 in order to receive the core 40 in a cavity 32 which is enclosed when the side arm 10, 110 is in the retracted position. Thus the core 40, 140 is completely hidden inside the side arm 10, 110 when the arm is in the retracted position, as is illustrated for side arm 110 in FIGS. 1 and 2.

The core 40, 140 thus extends between the pair of front legs 22, 24; 122, 124 and the pair of rear legs 26, 28; 126, 128 but also beyond, into the front portion 12 where it is attached to the front portion 12, 112 of the side arm 10, 110 by a pin 36, 136 as well as into the rear portion 14 where it comprises flexible front hooks 52a, 52b and flexible rear hooks 54a, 54b.

The retracted position and the extended position constitute two extreme positions along the sliding direction X'. The retracted position and the extended position are two stable positions in which the side arms of the pair of spectacles remain when there is no external action. There can also be a slight friction to prevent undesirable sliding between the front portion 12 and the rear portion 14. In the embodiment illustrated, as represented in FIG. 2 as a dotted line, when the side arm 10, 110 is in the retracted position, the front hooks 52a, 52b releasably catch on the pins 56a, 56b fixed to the rear portion 14. The cooperation of the front hooks 52a, 52b and the pins 56a, 56b prevents the rear portion 14, 114 of the side arm 10, 110 from sliding in the sliding direction X' relative to the core 40, 140 and to the front portion 12, 112 of the side arm 10, 110. The side arm 10, 110 is thus releasably retained in the retracted position.

However, as the front hooks 52a, 52b are flexible, by exerting sufficient force, the user can release the pins 56a, 56b from the front hooks 52a, 52b and thus cause the rear portion 14 to slide relative to the front portion 12 of the side arm 10, 110.

In a comparable manner, as illustrated in FIG. 3 with dotted lines, when the side arm 10, 110 is in the extended position, the rear hooks 54a, 54b releasably grip the pins 56a, 56b. The cooperation of the rear hooks 54a, 54b and the pins 56a, 56b thus releasably maintains the side arm 10, 110 in the extended position.

Advantageously, the core 40, 140 is of metal, while the front portion 12, 112 and the rear portion 14, 114 of the side arm 10, 110 are of plastic.

It should also be noted that when the side arm 10, 110 is in the retracted position, the outer surface 16, 116 of the front portion 12, 112 and the outer surface 18, 118 of the rear portion 14, 114 of the side arm 10, 110 are extensions of each other with no discontinuities, the free end of the front legs 22, 24; 122, 124 pressing against the rear portion 14, 114 in the sliding direction X' and the free end of the rear legs 26, 28; 126, 128 pressing against the front portion 12, 112 in the sliding direction X'. However, when the side arm 10, 110 is in the extended position, there are openings between the front legs 22, 24; 122, 124 and the rear portion 14, 114, and between the rear legs 26, 28; 126, 128 and the front portion 12, 112, revealing the core 40, 140.

The length of the front legs 22, 24; 122, 124 and the length of the rear legs 26, 28; 126, 128 in the sliding direction X' preferably corresponds substantially to the distance that the rear portion 14, 114 slides between its retracted position and its extended position. Thus, when the side arm 10, 110 is in the extended position, the front legs 22, 24; 122, 124 and the rear legs 26, 28; 126, 128 end substantially at the same level in the sliding direction X'.

The front portion 12, 112 of the side arm 10, 110 is assembled to pivot on the intermediate element 60, about a folding axis Z substantially perpendicular to the sliding direction X', between an unfolded position in which the sliding direction X' is substantially parallel to a longitudinal direction X, as illustrated in particular in FIGS. 1 to 3, and a folded position in which the side arm 10, 110 extends substantially along the viewing portion 2.

To do this, the intermediate element 60 and the front portion 12, 112 of the side arm 10, 110 are connected by a pin 30 extending along the folding axis Z. The intermediate element 60 presents two arms 62, 64, extending in the longitudinal direction X, forming a slot 66 between them which receives the tongue 11. The pin 30 is received in attachment holes arranged through the tongue 11 and the arms 62, 64.

The intermediate element 60 is received in a housing 4 in the viewing portion 2. The intermediate element 60 is mounted relative to the viewing portion 2 so that it can pivot about a pantoscopic adjustment axis Y, substantially perpendicular to the longitudinal direction X and to the folding axis Z, between a first extreme position illustrated in FIG. 6 and a second extreme position illustrated in FIG. 7.

To do this, a pin 58 extending along the pantoscopic adjustment axis Y passes through a main part 72 of the intermediate element 60 and is received in an attachment hole 5 in the viewing portion 2.

In order to retain the intermediate element 60, and the side arm 10, 110 supported by the intermediate element 60, in a given angular position on the pantoscopic adjustment axis Y relative to the viewing portion 2, the intermediate element 60 additionally comprises a notched section 68 cooperating with a notched section 8 arranged in the viewing portion 2, at the back of the housing 4.

Changing from one angular adjustment position on the pantoscopic axis Y to another is facilitated due to the fact that the notched section 68 is on a flexible portion 70 formed as part of the main portion 72 but thinner, such that the notched section is elastically movable radially to the pantoscopic adjustment axis Y and relative to said main portion 72.

The notched section 8 of the viewing portion 2 extends between a first extreme tooth 8a and a second extreme tooth 8b and comprises two teeth more than the notched section 68 of the intermediate element 60.

Thus when the pantoscopic element 60 is in a middle adjustment position, illustrated in FIG. 5, the notched section 68 engages with all the teeth of the notched section 8, except for the two extreme teeth 8a, 8b.

When the intermediate element 60 is pivoted in a first direction 74 on the pantoscopic adjustment axis Y, the notched section 68 is moved by one tooth relative to the notched section 8, so that it then engages with the extreme tooth 8a of the notched section 8, as illustrated in FIG. 6. The main portion 72 of the intermediate element 60 then abuts a lower wall 4a of the housing 4, at a distance from said first extreme tooth 8a, which limits the rotation of the intermediate element 60 relative to the viewing portion 2, about the pantoscopic adjustment axis Y, in the first direction 74.

Conversely, when the intermediate element 60 is pivoted from the middle adjustment position illustrated in FIG. 5, in a second direction 76 opposite the first direction 74 and about the pantoscopic adjustment axis Y, the notched section 68 moves by one tooth relative to the notched section 8 and engages with the extreme tooth 8b of the notched section 8, as illustrated in FIG. 7. The main portion 72 of the intermediate element 60 then abuts an upper wall 4b of the housing 4, at a distance from said first extreme tooth 8b, which limits the rotation of the intermediate element 60 relative to the viewing portion 2, in the second direction 74 about the pantoscopic adjustment axis Y.

Advantageously, the angular offset a between two consecutive teeth of the notched sections 8, 68, of the viewing portion 2 and the intermediate element 60 is respectively between 3 degrees and 7 degrees and is preferably substantially equal to 5 degrees.

Lastly, it will be noted that the housing 4 has an opening 6 comprising a frontal portion 6a extending substantially perpendicularly to the longitudinal direction X, and a side portion 6b, 106b extending substantially perpendicularly to the direction of the pantoscopic adjustment axis Y, the frontal portion 6a and the side portion 6b being adjacent.

The side portions 6b, 106b are facing one another, in other words they are facing the face of the user. In addition, each of the side portions 6b, 106b extends next to the slot 66 and corresponds to it in order to receive the tongue 11, without significant play in the direction of the folding axis Z when the side arm 10, 110 is folded.

In addition, the side arm 10, 110 and the viewing portion 2 each present a respective front surface 10a, 2a; 110a, 102a having a circular form centered on the pantoscopic adjustment axis Y, arranged close to and adjacent to one another when the side arm 10, 110 is in the unfolded position. Thus the frontal portion 6a of the opening 6 is hidden by the side arm 10, 110 when said arm is in the unfolded position, as illustrated in particular in FIGS. 5 to 7.

In addition, the intermediate element 60 is still received in its entirety within the housing 4, and does not extend beyond the opening 6 and is even recessed within said opening 6. As a result, the intermediate element 60 is almost invisible.

Of course, the invention is in no way limited to the embodiment just described as a non-limiting example. Thus, although it is not preferred, the housing 4 and the notched section 8 could be arranged in the front portion 12, 112 of the side arm 10, 110, and the tongue 11 could be integrally attached to the viewing portion 2. The intermediate element 60 would then be reversed back to front.

In addition, although this is not preferred, in an independent or combined manner the arms 62, 64 and the tongue 11 could be reversed, such that the tongue 11 is integrally attached to the intermediate element 60 and the arms 62, 64 are integrally attached to the front portion 12, 112 of the side arm 10, 110.

The invention claimed is:

1. Pair of spectacles comprising a viewing portion and two side arms each connected to the viewing portion, each side arm comprising a first portion and a second portion sliding relative to one another in a sliding direction between a retracted position and an extended position, wherein:
   the first portion extends in the sliding direction to a back end and comprises a first pair of legs, each projecting in the sliding direction from the back end of the first portion to a free end of the leg,
   the second portion extends in the sliding direction to a front end and comprises a second pair of legs, each projecting in the sliding direction from the front end of the second portion to a free end of the leg,
   the first pair of legs and the second pair of legs mutually engage such that in the retracted position the free ends of the first pair of legs face the front end of the second portion in the sliding direction, and the free ends of the second pair of legs face the back end of the first portion in the sliding direction.

2. Pair of spectacles according to claim 1, wherein each arm additionally comprises a core comprising four wings extending between the pairs of legs and connected to each other at a join line extending along the sliding direction.

3. Pair of spectacles according to claim 2, wherein the core extends along the sliding direction and has a cross-section perpendicular to the sliding direction that is in the form of a cross with orthogonal arms.

4. Pair of spectacles according to claim 2, wherein the core is attached to the first portion.

5. Pair of spectacles according to claim 4, wherein the second portion is retained in a releasable manner on the core when the side arm is in the extended position.

6. Pair of spectacles according to claim 4, wherein the second portion is retained in a releasable manner on the core when the side arm is in the retracted position.

7. Pair of spectacles according to claim 5, wherein the core comprises at least one hook suitable for catching on a pin attached to the second portion.

8. Pair of spectacles according to claim 2, wherein the first portion and the second portion are of plastic, and the core is of metal.

9. Pair of spectacles according to claim 2, wherein the core is concealed between the first portion and the second portion when the side arm is in the retracted position.

10. Pair of spectacles according to claim 1, wherein the first portion and the second portion each present an outer surface that is flush with the outer surface of the other when the side arm is in the retracted position.

11. Pair of spectacles according to claim 1, wherein the retracted position and the extended position constitute two extreme sliding positions along the sliding direction, between which any relative rotational motion between the first portion and the second portion of each side arm is prevented.

12. Pair of spectacles according to claim 1, wherein the retracted position and the extended position constitute two stable positions.

* * * * *